(12) United States Patent
Kotulla et al.

(10) Patent No.: US 7,387,000 B2
(45) Date of Patent: Jun. 17, 2008

(54) METHOD OF PRODUCING A HOLLOW GLASS CYLINDER WITH SUSPENSION DURING SINTERING

(75) Inventors: Gerhard Kotulla, Hanau (DE); Klaus Ruppert, Maintal (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 3 days.

(21) Appl. No.: 10/451,453

(22) PCT Filed: Dec. 18, 2001

(86) PCT No.: PCT/EP01/14997

§ 371 (c)(1),
(2), (4) Date: Oct. 16, 2003

(87) PCT Pub. No.: WO02/051759

PCT Pub. Date: Jul. 4, 2002

(65) Prior Publication Data
US 2004/0065121 A1    Apr. 8, 2004

(30) Foreign Application Priority Data
Dec. 22, 2000 (DE) ................ 100 64 730

(51) Int. Cl.
*C03B 37/018* (2006.01)
(52) U.S. Cl. .............. 65/421; 65/422; 65/427
(58) Field of Classification Search ........... 65/421, 65/422, 507, 509, 531, 399, 427
See application file for complete search history.

(56) References Cited

U.S. PATENT DOCUMENTS 3,620,704 A    11/1971  Gray
3,806,570 A *  4/1974  Flamenbaum et al. ...... 264/1.21
4,157,906 A    6/1979  Bailey (Continued)

FOREIGN PATENT DOCUMENTS

EP            252486 A2 *    1/1988

(Continued)

OTHER PUBLICATIONS

English abstract for JP 62-256733, Nov. 9, 1987.

(Continued)

*Primary Examiner*—John Hoffmann
(74) *Attorney, Agent, or Firm*—Tiajoloff and Kelly

(57) ABSTRACT

The invention relates to a method for producing a silica glass tube which is characterized by depositing $SiO_2$ particles on an elongate support that rotates about its longitudinal axis, thereby producing a porous with a cylindrical inner bore. Said blank is vertically aligned, suspended in a furnace using a suspension that engages with a constriction in the upper zone of the inner bore of the blank, and vitrified. The aim of the invention is to provided a method with which also heavy blanks can be secured safely and substantially without any danger of contaminations of the inner bore without using complicated securing devices. To this end, the constriction (6b) is generated by shaping the inner bore (7) when the $SiO_2$ particles are deposited. For vitrification a suspension (8; 9; 10) is used that supports itself on the constriction (6b) and that otherwise projects into the cylindrical inner bore (7) without having any contact therewith.

19 Claims, 2 Drawing Sheets

Figure 1:
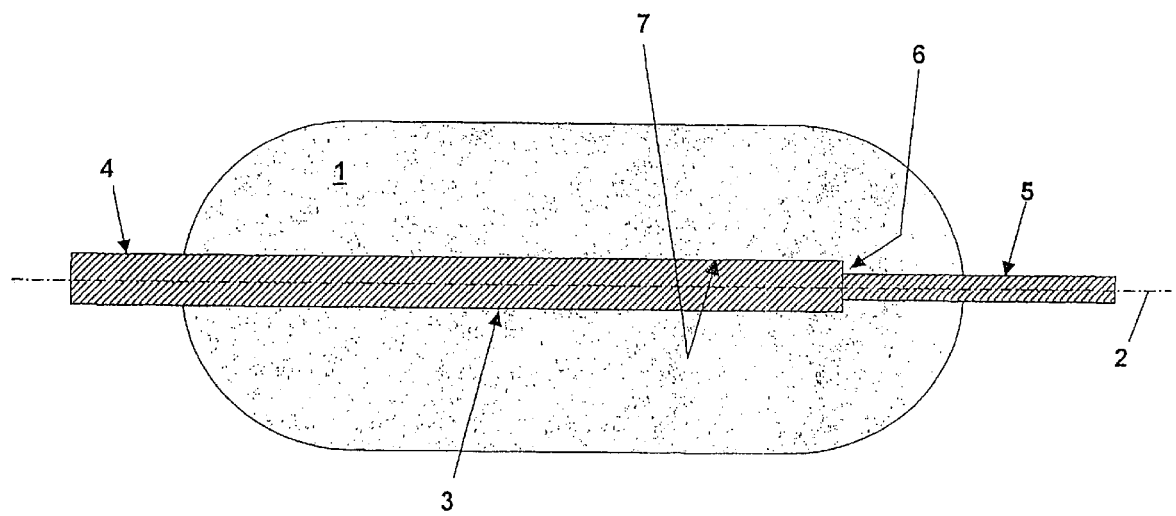

U.S. PATENT DOCUMENTS 4,362,545 A    12/1982  Bailey
5,149,349 A *   9/1992  Berkey et al. ................. 65/403
5,665,132 A *   9/1997  Ruppert et al. .............. 65/17.1
5,769,921 A *   6/1998  Yokokawa ................... 65/412
5,837,024 A *  11/1998  Fabian ....................... 65/17.4

FOREIGN PATENT DOCUMENTS

EP    0 701 975 A2    3/1996
JP    62-256733       11/1987
JP    6-48757         2/1994

OTHER PUBLICATIONS

English abstract for JP 6-48757, Feb. 22, 1994.

* cited by examiner

METHOD OF PRODUCING A HOLLOW GLASS CYLINDER WITH SUSPENSION DURING SINTERING

The present invention relates to a method of producing a hollow cylinder from silica glass, comprising the step of depositing $SiO_2$ particles onto an elongate support that rotates about its longitudinal axis, thereby producing a porous blank with a cylindrical inner bore, and the step of vitrifying the blank which is suspended in vertical orientation in a furnace using a suspension that engages with a constriction provided in the upper region of the inner bore of the blank.

Furthermore, the present invention relates to a silica glass tube and an optical component of silica glass, comprising a light-guiding structure formed by a coaxial sequence of silica glass layers of different refractive indices.

Furthermore, the present invention relates to an apparatus for carrying out the method, comprising an essentially cylindrical support which can be rotated about its longitudinal axis and on the outer cylinder surface of which $SiO_2$ particles are deposited, thereby forming a porous blank having an inner bore, and comprising a suspension engaging into the inner bore for holding the blank in vertical orientation during a vitrifying step.

Preforms for optical fibers are often produced via an intermediate product in the form of a porous blank of silicon dioxide soot (hereinafter also called "blank" or "soot cylinder"). The further processing of the soot cylinder includes a vitrifying step in which the soot cylinder is heated in a vitrifying furnace in suspended fashion, thereby being vitrified into a dense silica glass tube. Many measures have been suggested for holding or mounting the soot cylinder.

In a method known from U.S. Pat. No. 4,252,251, the mounting consists of a platinum wire which extends through a radial through-hole in the upper region of the soot body and on which the soot body is suspended.

DE-A1 29 06 070 suggests a mounting in which a silica glass tube is inserted from above into the cylindrical inner bore that comprises hump-like thickened portions at its lower end intended for insertion into the soot cylinder. For anchoring the silica glass tube in the inner bore, the thickened portions are rotated by 90°, so that these will dig into the soft soot material.

These procedures are accompanied by objectionable wear and do not ensure a safe handling, especially in the case of heavy soot bodies having a large volume.

Finally, U.S. Pat. No. 4,362,545 discloses a mounting in which a sleeve is embedded in a stable way over part of its length in an end of the soot body during deposition of the $SiO_2$ particles. To this end the support extends through the sleeve, the support being geometrically fixed by means of spacers clamped in the gap between sleeve and support. Sleeve and support consist, for instance, of alumina, graphite or silica glass. During deposition, both the carrier and part of the sleeve are embedded in the developing blank. After deposition the support is removed and the blank can be held in suspended fashion in vertical orientation on the embedded sleeve for further processing. Due to play during movement (rotation) of the support it may happen that the gap between support and sleeve tears open or is not bridged by the deposited $SiO_2$ material, so that the sleeve is not embedded in the blank or is embedded therein in an inadequate way. Therefore, a careful matching of the dimensions of sleeve and carrier, an exact observance of measurement tolerances and an expensive adjustment are needed, which makes production and the use of the known holder more difficult, especially if this member consists of silica glass.

A method and an apparatus of the above-mentioned type are known from EP-A 701 975. This document suggests a method for sintering a soot cylinder with cylindrical IB, wherein said cylinder is supplied in vertical orientation, standing on a holding foot, to a heating zone and is sintered therein in portions. A support tube of porous graphite which has the soot cylinder shrunk thereonto during vitrification extends through the inner bore of the soot cylinder. A special feature of the known method is that the soot cylinder suspends itself during sintering. This is accomplished in that the upper region of the inner bore has screwed thereinto a surrounding support ring which narrows the inner diameter thereof and which due to the longitudinal contraction of the soot cylinder in the course of the sintering process will come to rest on the upper face of the support tube. In this process the soot cylinder is lifted from the holding foot, so that the further sintering process is carried out with a vertically suspended soot cylinder.

Due to the fastening of the support ring in the inner bore of the soot cylinder there may be undesired wear. Contaminations from the graphite of the support tube may pass into the soot cylinder, particularly due to the direct contact between support ring and inner bore of the soot cylinder.

After vitrification of the known soot cylinders these are used for producing optical performs. As is generally known, these have a light-guiding structure that is formed by a coaxial sequence of silica glass layers of different refractive indices. Optical fibers are drawn from the preforms. The optical attenuation thereof is essentially influenced by the contamination contained in the quartz glass of the preforms, particularly by contaminations in the light-guiding region.

It is the object of the present invention to improve the above-indicated method such that during vitrification heavy blanks can also be held in a safe way without any complicated holding devices and substantially without any danger of contaminations of the inner bore and to indicate a suitable holding device therefor. Furthermore, it is the object of the present invention to indicate a hollow cylinder of silica glass with a high-purity inner bore, as well as an optical component of silica glass which is characterized by a low content of contamination.

As for the method, said object, starting from the above-indicated method, is achieved according to the invention in that the constriction is generated by shaping the inner bore when the $SiO_2$ particles are deposited, and that for vitrification a suspension is used that supports itself on the constriction and otherwise projects into the inner bore without having any contact therewith.

According to the invention a constriction of the inner bore is already produced during the deposition process by the design of the inner bore. This avoids a subsequent processing of the porous blank for fastening a holding element, and also the wear that is always caused thereby. Since a constriction of the inner bore is generated during the shaping thereof, there is no need for embedding a holding element, as explained above with respect to the prior art. This shall be substantiated in the following.

The constriction generated during shaping of the inner bore serves as an abutment for a suspension during vitrification of the blank. This constriction is only introduced into the inner bore for vitrification. The suspension will project into the inner bore such that the constriction previously generated during the deposition process is supported on the suspension. This ensures a reliable support of the blank without a holding element being embedded in the blank or fastened thereto.

The danger of contaminations in the blank does also not arise because the constriction of the inner bore is formed from the specific material thereof.

Apart from the contact in the area of the suspension with the constriction, the suspension will project without any contact into the inner bore during vitrification. As a consequence, an inner bore shaped without a tool is obtained after vitrification. Said shaping without any tool entails an inner wall of a high quality with a smooth inner surface that is free from any damage and that is additionally characterized by a low content of contamination.

Preferably, the constriction is produced in that during deposition of the $SiO_2$ particles a support is used that, when viewed over its length, is provided in a tapered portion with a reduction of its outer diameter, the deposition of the $SiO_2$ particles also including a deposition in the tapered portion. The reduction of the outer diameter in the tapered portion effects the constriction of the inner bore of the blank. The reduction of the outer diameter is a gradual tapering of the outer diameter of the support or a stepwise reduction. The reduction of the outer diameter is in rotational symmetry, symmetrical or asymmetrical with respect to the longitudinal axis of the support. It may e.g. consist of a flattened portion of the outer support surface at one side. It is just essential that undercuts are avoided that would make it more difficult to remove the support after the deposition process. One or several tapered portions are provided. The $SiO_2$ particles are also deposited in the tapered portion, so that the developing blank covers at least a reduction of the outer diameter of the support.

It has turned out to be of particular advantage that the reduction of the outer diameter is made to be in rotational symmetry with respect to the longitudinal axis of the support. Such a reduction of the outer diameter effects a rotationally symmetrical and radially surrounding constriction of the inner bore, which ensures a stable mounting.

Particularly suited is a reduction of the outer diameter that comprises a surrounding shoulder. In this instance the constriction of the inner bore has a corresponding radially surrounding shoulder. This permits a defined and stable mounting of the blank in a simple way.

In a particularly preferred variant of the method the suspension projects from above into the inner bore, so that it grips behind the constriction. Since the suspension grips from above into the inner bore, a holding device within the inner bore, e.g. the "support tube" as used in the generic method, is not needed most of the time. Contaminations inside the inner bore and a contact of the wall of the inner bore with a foreign material are thereby largely avoided. In the simplest case the inner bore comprises a stepwise constriction of the diameter, the suspension, formed in a way similar to a yarn roll, comprising a holding foot whose outer diameter is smaller than the inner diameter of the inner bore, but larger than the inner diameter in the area of the diameter constriction, and which is connected to a rod-like holder whose outer diameter is smaller than the inner diameter in the area of the diameter constriction.

A further improvement of the method of the invention is achieved in that at least part of the suspension consists of silica glass. Preferably, the parts of the suspension in direct vicinity of the blank consist of silica glass.

Furthermore, it has turned out to be of advantage when the suspension is fused with the blank during vitrification. This achieves an intimate and particularly firm connection ensuring a reliable handling of the blank.

As for the hollow cylinder, the above-indicated object is achieved according to the invention in that after vitrification it comprises a cylindrical inner bore shaped without a tool.

The cylindrical inner bore of the hollow cylinder is given its shape during vitrification according to the above-described method. According to the invention the inner bore is obtained by shaping without a tool. Shaping without a tool means that during vitrification any contact of the wall with a component, e.g. a holding rod, arranged inside the inner bore is avoided, so that an inner wall of high quality is formed with a smooth inner surface that is free from any damage and that is characterized, in addition, by a low content of contamination.

Due to the cylindrical inner bore that is free from damage and contaminations, the hollow cylinder obtained in this way is suited for producing so-called "substrate tubes". These are used for producing optical performs by inner deposition of core material on the inner wall of the substrate tube ("MCVD method" or "PCVD method"). The hollow cylinder, however, is also suited in the form of a so-called "jacket tube" for overcladding core rods for the purpose of applying additional jacket material.

As for the optical component, the above-indicated object is achieved according to the invention in that at least part of the quartz glass layers is made from a hollow cylinder according to the invention.

The optical component is a so-called core rod, an optical perform, or an optical fiber. Since at least part of the silica glass layers of the optical component is made from the silica glass rod of the invention, it is characterized by a low content of contamination. Therefore, the optical fibers that are drawn from a preform of the invention or are obtained using a core rod of the invention show a low optical attenuation.

As for the apparatus, the above-mentioned object, starting from the above-mentioned method, is achieved according to the invention in that the support has a first larger outer diameter over a first partial length and a second smaller outer diameter over a second partial length, and that the suspension comprises an elongated handling means connected to a thickened portion, the diameter of the enveloping circle around the outer cross-section of the handling means, when viewed in longitudinal direction, being smaller than the second outer diameter, and the diameter of the enveloping circle around the outer cross-section of the thickened portion, viewed in longitudinal direction, being smaller than the first outer diameter and larger than the second outer diameter.

The apparatus according to the invention is only obtained on account of the matched shaping of two separate components, namely the support on the one hand, on which the $SiO_2$ particles are deposited forming a blank, and on the other hand the suspension engaging into the inner bore of the blank during vitrification. The outer shape of the support gives the blank an inner bore which has a larger diameter over a first partial length and a smaller diameter over a second partial length, the transition between larger to smaller diameter being designated as a "constriction", as is described in more detail with reference to the above method of the invention. This constriction, in turn, serves as an abutment for the suspension. To this end the suspension comprises a handling device that fits through that partial length of the inner bore having the smaller diameter, and that is connected to a thickened portion that although it fits through that partial length of the inner bore with the larger diameter, does not fit through that partial length of the inner bore with the smaller diameter. With the suspension the blank can be held in vertical orientation, the thickened portion of the suspension gripping behind the constriction of the inner bore. Both the suspension and the support are designed in a simple way.

It has been found to be of particular advantage when the support between the first partial length and the second partial length, and the suspension between the handling device and the thickened portion are each equipped with a surrounding shoulder. Such a shoulder can be produced in a particularly simple way, and it ensures a reproducible mounting of the blank during vitrification in vertical orientation.

Figure 2:
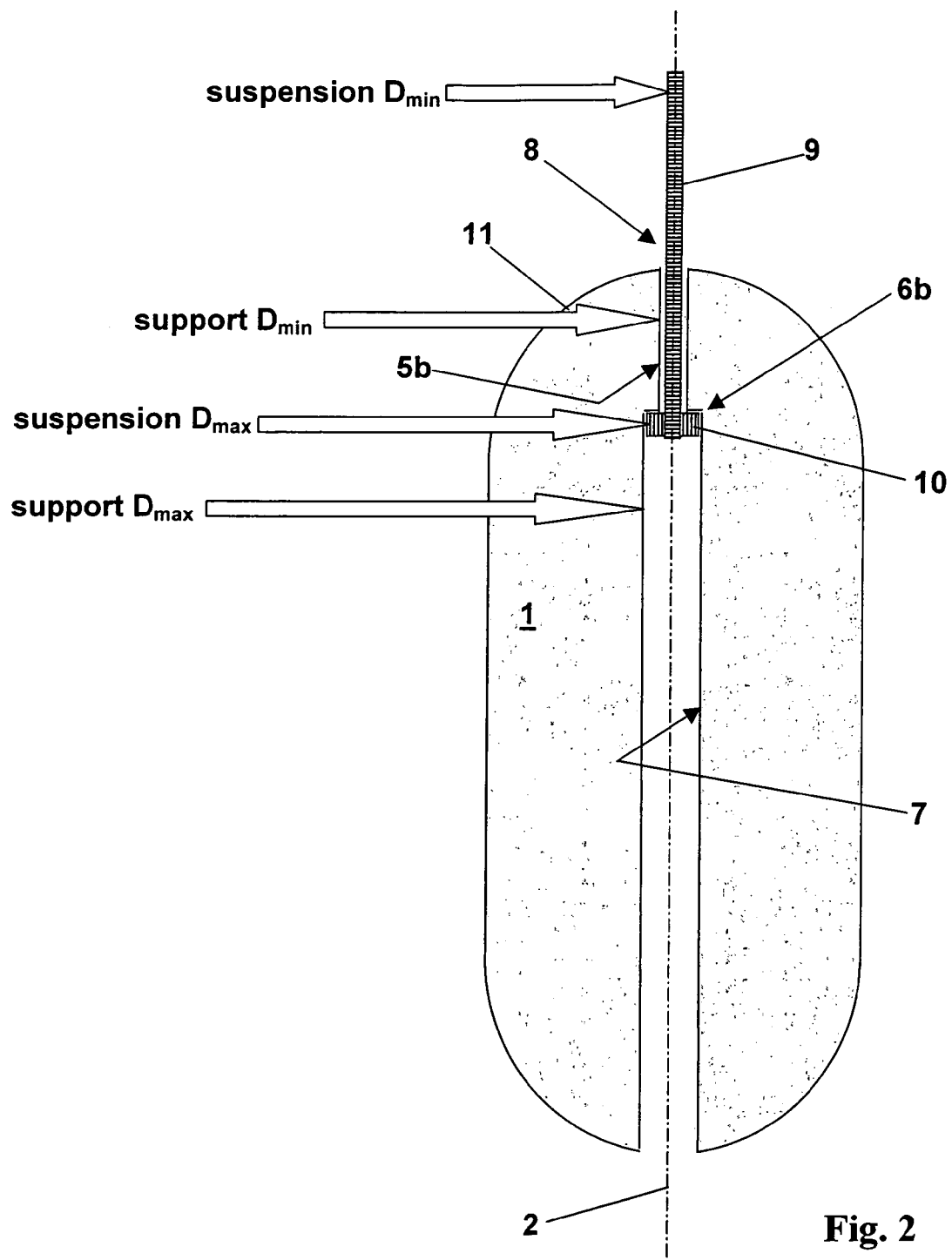

The present invention shall now be explained in more detail with reference to an embodiment and a drawing. The drawing is a schematic detailed illustration showing in FIG. 1 the method step of depositing a porous blank using a stepped support tube;

FIG. 2 the method step of vitrifying the blank.

FIG. 1 schematically shows the method step of depositing a porous blank 1 using a stepped support tube 3. The blank 1 is here produced by means of the known flame hydrolysis method by exterior deposition of $SiO_2$ particles on the support tube 3, which is rotating about its longitudinal axis 2 by means of one or more hydrolysis burners (not shown in FIG. 1) that are moved along the surface of the developing blank 1.

The support tube 3 has a first and larger longitudinal section 4 and a second and shorter longitudinal section 5. The outer diameter in the longitudinal section 4 of 60 mm decreases in a surrounding step 6 to an outer diameter of 54 mm in the longitudinal section 5 of the support tube 3.

After the depositing process has been completed, the support tube 3 is removed by drawing it out of the blank 1 in the direction of the longitudinal section 4. The blank 1 produced in this way includes an inner bore 7 which has an inner diameter of substantially 60 mm, but in the area of the longitudinal section 5*b* (see FIG. 2) is reduced over a length of 10 cm by 6 mm. The surrounding shoulder produced by step 6 in the inner bore of the blank 1 is designated in FIG. 2 with reference numeral 6*b*.

FIG. 2 schematically shows the step of vitrifying the blank 1. To this end the blank 1 which has been obtained according to the above-described depositing process and has a stepped inner bore 7 is heated in vertical orientation zonewise, starting with the upper end, in a vitrifying furnace. In this process the blank 1 is held by means of a suspension 8 which consists of a rod 9 of silica glass that is centrally welded to a circular silica glass plate 10. The outer diameter of the silica glass plate 10 is about 59 mm; that of the silica glass rod 9 about 30 mm.

The suspension 8 is introduced from below into the blank 1 and drawn upwards through the blank until abutment on shoulder 6*b*. The silica glass rod 9 has a length of 50 cm, so that it extends through the whole longitudinal section 5*b* and projects out of the upper end 11 of the blank 1. Since the silica glass plate 10 grips behind the shoulder 6*b*, the blank 1 can be reliably held by means of the suspension 8. The shoulder 6*b* produced during the shaping of the inner bore 7 serves as an abutment for the suspension 8 during vitrification of the blank 1.

A hollow cylinder of silica glass is obtained from the blank 1 by vitrification. During vitrification part of the suspension 8 (silica glass plate 10 and part of the silica glass rod 9) is fused with blank 1, so that a firm and intimate connection is ensured between blank 1 and suspension 8. Since the suspension 8 has no mechanical contact with the cylindrical surface of the inner bore 7, an inner wall that has been shaped without any tool and has a high surface quality is obtained after vitrification.

Since the shoulder 6*b* is produced during shaping of the inner bore 7, a subsequent fastening of a holding element is not required, so that wear and the introduction of contaminations are avoided. The suspension 8 will only be inserted into the inner bore 7 after the deposition process, the suspension cooperating with the previously produced shoulder 6*b*. Therefore, a holding element need also not be embedded into the blank, as is known in the prior art.

As an alternative to the support 3 shown in FIG. 1 with step 6, a transition region is provided in a further embodiment, in which transition region the outer diameter of the support tube 3 conically tapers from the longitudinal section 4 of an outer diameter of 60 mm to the longitudinal section 5 with an outer diameter of 54 mm. The blank shaped by means of said support is provided with an inner cone accordingly. For holding the blank during vitrification, a holding element is introduced from below that has an outer cone corresponding to said inner cone. In this instance, too, any contact of the suspension with the cylindrical surface of the inner bore is avoided during vitrification, so that an inner wall of a high surface quality is obtained after vitrification, the inner wall being shaped without any tool.

The hollow cylinder of silica glass produced in this way is suited for use as a "jacket tube" for overcladding a core rod with jacket material of silica glass, or it is further processed into a so-called "substrate tube" for use in the production of optical preforms for optical waveguides according to the so-called MCVD method. The preforms and optical fibers produced by using the hollow cylinder according to the invention are characterized by low optical attenuation.

The invention claimed is:

1. A method for producing a hollow cylinder from silica glass, said method comprising:

depositing $SiO_2$ particles onto an elongate support that rotates about a longitudinal axis thereof, said support having a first longitudinal section with a first outer diameter and a second longitudinal section with a second outer diameter, the first outer diameter being larger than the second outer diameter, so as to produce a porous blank with an inner bore defined by a first cylindrical surface extending over a first length of the blank and having a first inner diameter, and by a second cylindrical surface extending over a second length of the blank and having a second inner diameter, and an area therebetween, the first inner diameter being larger than the second inner diameter so that said area between the first longitudinal section and the second longitudinal section has a constriction in said inner bore of said blank, said constriction being formed by said support by shaping the inner bore during said $SiO_2$ deposition, and vitrifying the blank suspended in vertical orientation in a furnace using a suspension that engages with said constriction, said constriction being in an upper region of the blank; said suspension having an upper portion and a lower portion, said upper portion being smaller than the second inner diameter, and said lower portion having a size between the first inner diameter and the second inner diameter, and wherein during said vitrification said suspension extends into the inner bore and supports the blank by engagement with said blank in said area of said constriction, said suspension having no contact with said first cylindrical surface of the inner bore of the blank during said vitrification.

2. The method according to claim 1, wherein the support has a reduction in diameter between the first and second longitudinal sections that is rotationally symmetrical relative to a longitudinal axis of said support.

3. The method according to claim 2, wherein the reduction in diameter of the support comprises a surrounding shoulder.

4. The method according to claim 3, wherein said suspension projects from above into the inner bore, so that said suspension is secured behind said constriction.

5. The method according to claim 2, wherein said suspension projects from above into the inner bore, so that said suspension is secured behind said constriction.

6. The method according to claim 1, wherein said suspension projects from above into the inner bore, so that said suspension is secured behind said constriction.

7. The method according to claim 1, wherein at least part of said suspension is formed of silica glass.

8. The method according to claim 7, wherein said suspension is fused with said blank during vitrification.

9. The method according to claim 1, wherein said suspension is fused with said blank during vitrification.

10. A method for producing a hollow cylinder from silica glass, said method comprising:

depositing $SiO_2$ particles onto an elongate support that rotates about a longitudinal axis thereof, said support having a first longitudinal section with a first outer diameter and a second longitudinal section, the first outer diameter being larger than a largest radial dimension of the second longitudinal section so that said depositing step produces a porous blank with a wall defining an inner bore extending through said porous blank, the wall including a cylindrical surface that has an inner diameter extending over a partial length of the blank up to an upper region of the porous blank the wall also including an area wherein there is a constriction in the inner bore in said upper region, and suspending the blank in a vertical orientation on a suspension structure, said suspension structure extending downwardly through the inner bore in an upper end of the blank, and having a thickened portion, said thickened portion being sized so as to pass through said partial length of the blank and the cylindrical surface, and being so large that said thickened portion cannot pass through the inner bore at the constriction, and engages the wall and supports the porous blank in said upper region of the blank, and vitrifying the blank suspended in said vertical orientation in a furnace, during said vitrification said suspension structure having no contact with the cylindrical surface.

11. The method according to claim 10, wherein the support has a reduction in diameter between the first and second longitudinal sections that is rotationally symmetrical relative to a longitudinal axis of said support.

12. The method according to claim 11, wherein the reduction in diameter of the support comprises a surrounding shoulder.

13. The method according to claim 12, wherein at least part of said suspension structure is formed of silica glass.

14. The method according to claim 13, wherein said suspension structure is fused with said blank during the vitrification.

15. The method according to claim 11, wherein at least part of said suspension structure is formed of silica glass.

16. The method according to claim 15, wherein said suspension structure is fused with said blank during the vitrification.

17. The method according to claim 10, wherein at least part of said suspension structure is formed of silica glass.

18. The method according to claim 17, wherein said suspension structure is fused with said blank during the vitrification.

19. The method according to claim 10 wherein said suspension structure is fused with said blank during vitrification.

* * * * *